J. E. COFFEY.
AUTOMOBILE LIFTER.
APPLICATION FILED FEB. 26, 1919.

1,351,506.

Patented Aug. 31, 1920.
2 SHEETS—SHEET 1.

Inventor
J. E. Coffey,
By D. Swift & Co.
Attorneys

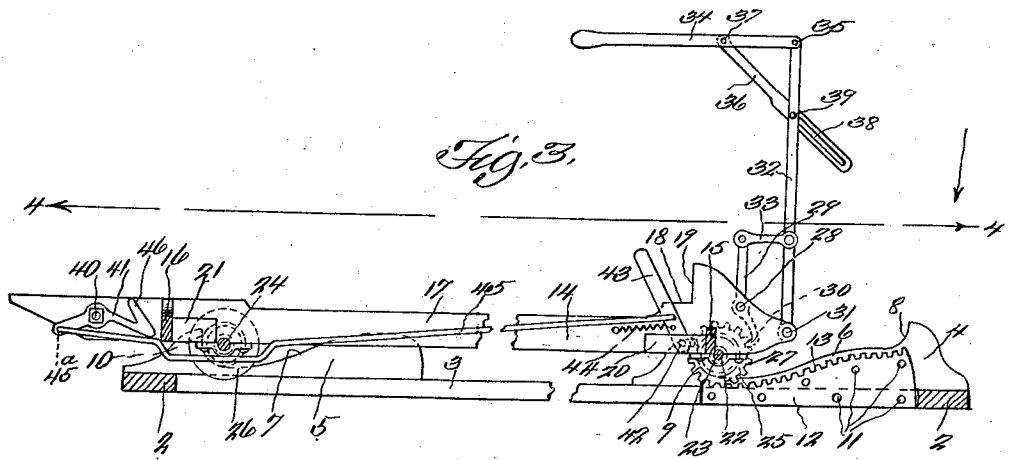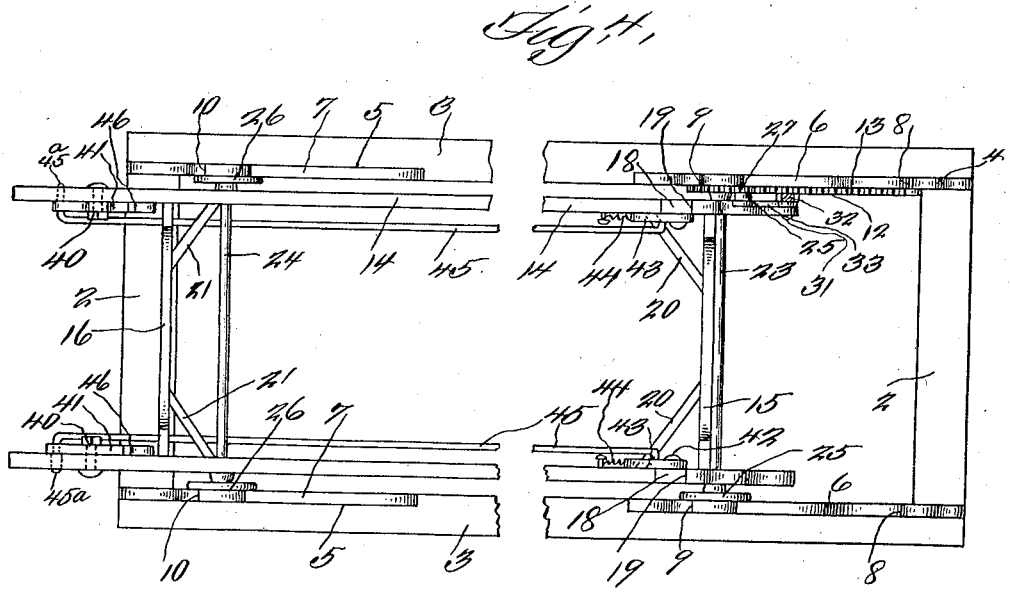

UNITED STATES PATENT OFFICE.

JACOB EDWARD COFFEY, OF CASEY, ILLINOIS.

AUTOMOBILE-LIFTER.

1,351,506.

Specification of Letters Patent.  Patented Aug. 31, 1920.

Application filed February 26, 1919. Serial No. 279,319.

*To all whom it may concern:*

Be it known that I, JACOB EDWARD COFFEY, a citizen of the United States, residing at Casey, in the county of Clark, State of Illinois, have invented a new and useful Automobile-Lifter; and I do hereby declare the following to be a full, clear, and exact description of the invention, such as will enable others skilled in the art to which it appertains to make and use the same.

This invention relates to an improved automobile lifter, and an object of the invention is to provide a simple, efficient and practical device, to be actuated by the front axle of the automobile, for automatically raising or lifting the automobile, truck or the like, whereby the tires of wheels are disengaged from the ground, thereby relieving the pressure on the tires while the automobile is in storage.

A further object is to provide a device of this kind comprising a stationary base frame, and an auxiliary movable superimposed frame, the latter being adjustable on tracks of the former, through the medium of supporting wheels, one of which being provided with teeth to engage a rack on the inside of one of the side bars of the base frame.

A further object of the invention is to provide means for holding the movable frame in its forward position on the base frame.

A further object of the invention is to provide means for raising or lifting the rear of the automobile to prevent engagement of the radius rods of the automobile with the movable frame.

In practical fields the details of construction may necessitate alterations falling within the scope of what is claimed.

The invention comprises further features and combination of parts, as hereinafter set forth, shown in the drawings and claimed.

In the drawings:—

Fig. 3 is a longitudinal sectional view through Fig. 1.

Fig. 4 is a plan view of Fig. 3 below the line 4—4.

Figure 1:
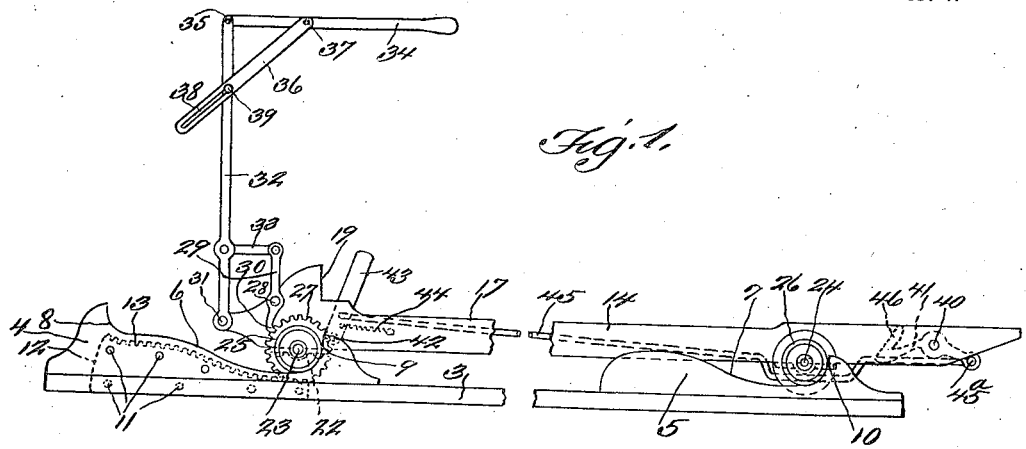
Figure 1 is a view in side elevation of the improved lifter constructed in compliance with the invention, showing the movable frame in its normal position.
Figure 2:
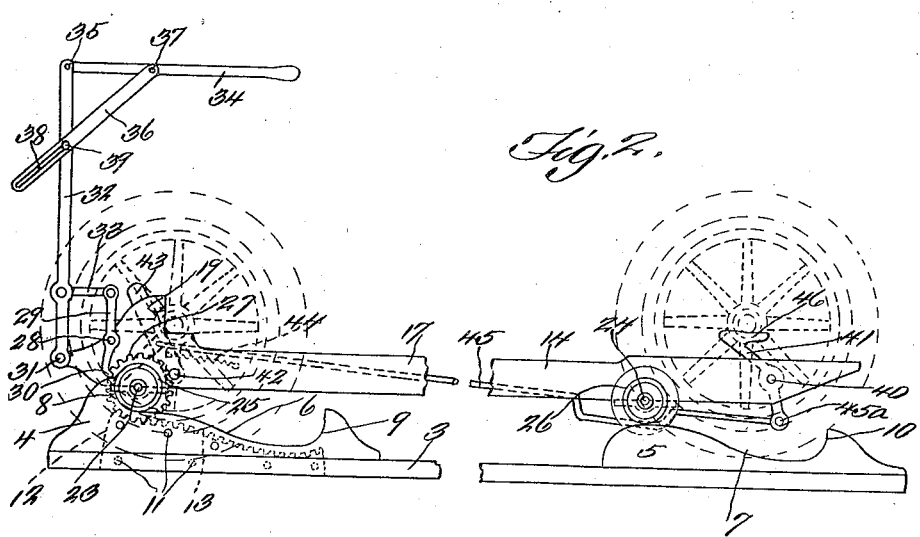
Fig. 2 is a view in side elevation, showing the movable frame as having been moved, thereby lifting the automobile, so that the wheels are disengaged from the ground.

Referring more especially to the drawings 1 designates a base frame, which comprises the end bars 2 and the side bars 3. Mounted on and rising upwardly from the side bars near their ends are forward and rear flanges 4 and 5, provided with inclined tracks 6 and 7, which are curved as shown. The forward ends of the tracks 6 terminate in curved shoulders or abutments 8, and their rear ends terminate in similar abutments 9. The tracks 7 are provided with curved abutments or shoulders 10 at their rear ends. Secured at 11 to the inner face of one of the flanges 4 is a plate 12 having rack teeth 13, and these teeth are arranged to conform to the curvature of the track 6. A superimposed frame 14 is provided, and comprises the end cross bars 15 and 16 and the side bars 17. The forward portions of the side bars 17 are provided with supporting and abutment shoulders 18 and 19. The cross bars and side bars are reinforced by the braces 20 and 21. Journaled in bearings 22 of the side bars 17 are forward and rear axles 23 and 24, provided on their ends with supporting wheels 25 and 26. These wheels are flanged so as to be retained on the tracks with which they engage. It is to be noted that the forward and rear abutments of the tracks fore and aft of the base frame, conform to the curvature of the treads of the wheel, thereby limiting the superimposed frame in its movements. One of the wheels 25 has its flange provided with teeth 27, to engage the rack teeth 13. Pivoted at 28 to the forward portion of one of the side bars 17 is a dog 29, the nose 30 of which engages the teeth of the wheel 25. This nose is shaped so as to ratchet over the teeth 27 as the auxiliary superimposed frame is moved forward by the axle of the automobile, thereby retaining the superimposed frame in its forward position, and since the front axle of the automobile is resting on the shoulder 18 the forward end of the automobile will be held in a raised position. Also pivoted to the forward end of one of the side bars 17 as at 31 is a lever 32, and connecting this lever and the tail end of the dog 29 is a link 33. A lever 34 is pivoted at 35 to the upper end of the lever 32. A link 36 is pivoted at 37 to the lever 34, and this link has a slot and pin connection 38 and 39 with the lever 32. By one end of the slot 38 engaging the pin 39, the lever 34 is supported in the manner shown in the drawings. Pivoted at 40 to the inner faces of the side bars 17 at their rear ends are lifting levers 41. Pivoted at 42 to the inner faces of the side bars 17 near their forward ends are abutment levers 43, which are under tension of the springs 44. These springs are connected to the side bars 17, and in turn to the levers 43. Rods 45 connect the lifting levers and the abutment levers in such wise as to operate the lifting levers, when the forward axle of the automobile bears sufficiently against the levers 43 to overcome the action of the springs 44. The lifting levers are provided with axle engaging portions 46, which extend at acute angles to the levers. These portions 46 are designed to engage under the rear axle of the automobile as shown in Fig. 2, so as to lift the automobile sufficiently as to prevent the radius rods from contacting with the sides of the superimposed frame, and to lift the automobile so as to disengage the tires from the ground. In order that an automobile may be lifted, the same is operated so as to traverse over the two frames, that is, the wheels to straddle the frames. While the automobile is in motion, the front axle will contact with the levers 43, the superimposed frames will then be moved forwardly, the dog ratcheting over the teeth of one of the supporting wheels. As the superimposed frame moves forward the flanged wheels ride the inclined tracks, and since the shoulders 18 are under the front axle of the automobile, the forward ends of the automobile is raised, and when the forward supporting wheels 25 contact with the abutment shoulders 8 the dogs will prevent retrograde movement of the auxiliary frame. The tension of the springs 44 is designed to be such as not to be overcome by the pressure of the forward axle of the automobile, that is entirely overcome, until the treads of the forward wheels 25 are somewhat closely approaching the abutment shoulders 8, and in this case the rear drive wheels of the automobile are still in engagement with the ground. At this stage of the operation it is necessary to apply manual pressure at the rear of the automobile, sufficiently to cause the front axle thereof to engage the shoulders 19, so as to move the superimposed frame sufficiently to cause the front wheels 25 to engage the shoulders 8. When the front axle of the automobile engages the shoulders 19, the levers 43 will have been operated sufficiently to operate the lifting levers 41, so that the portions 46 will engage under the rear axle of the automobile and lift the same to free the tires from the ground. To lower the automobile a pulling action may be imparted on the lever 34, consequently tilting the lever 32 and the dog 29, in which case the superimposed frame is free to retrograde, then the automobile may be lowered sufficiently to permit the wheels to engage the ground, and subsequently backed from over the two frames.

The invention having been set forth, what is claimed as new and useful is:—

1. The combination with a base frame having inclined tracks provided with abutments, of a superimposed frame provided with flanged wheel connections with said tracks, spring tensioned levers to be engaged by the forward axle of the automobile to move the superimposed frame forwardly, whereby it may engage under and lift the forward axle thereof and consequently the automobile, and a second pair of levers pivoted to the rear of the superimposed frame provided with lifting arms to engage under the rear axle of the automobile to lift the rear end thereof, and connections between the first and second levers, one of said tracks having rack teeth, one of the wheel connections having teeth to engage the rack teeth, and ratchet means coöperating with the teeth of the wheel connections to hold the superimposed frame in its forward raised position.

2. The combination with a base frame having inclined tracks provided with abutments, of a superimposed frame provided with flanged wheels engaging said tracks, spring tensioned levers adapted to be engaged by the forward axle of the automobile to move the superimposed frame forwardly, whereby it may engage under and lift the forward axle of an automobile, a pair of levers pivoted to the rear of the superimposed frame and provided with lifting arms to engage under the rear axle of the automobile to lift the rear end thereof, connections between the first and second levers, a rack bar secured to one of the tracks and conforming to its curvature and inclination but disposed below the upper surface of said track, one of the flanged wheels having its flange provided with teeth for engaging the rack bar teeth, said interengaging teeth and rack bar being in mesh as the superimposed frame is moved upwardly on the tracks, a ratchet wheel located at the forward end of the superimposed frame and a dog pivoted to the frame and coöperating with the ratchet wheel and forming means whereby as the superimposed frame moves forwardly said ratchet wheel ratchets by the pivoted dog and holds said superimposed frame to any position to which it may have been moved, and the interengaging teeth of the wheel flange and rack bar preventing the movement of the superimposed frame from the position to which it may have been moved.

In testimony whereof I have signed my name to this specification in the presence of two subscribing witnesses.

JACOB EDWARD COFFEY.

Witnesses:
 R. B. FITZPATRICK,
 IRENE TALLE.